US008793291B2

(12) United States Patent
Plax et al.

(10) Patent No.: US 8,793,291 B2
(45) Date of Patent: Jul. 29, 2014

(54) SYSTEM, METHOD AND COMPUTER PROGRAM PRODUCT FOR DEPLOYING AN UPDATE BETWEEN ENVIRONMENTS OF A MULTI-TENANT ON-DEMAND DATABASE SYSTEM

(75) Inventors: Jonathan Plax, San Francisco, CA (US); Timothy Kral, San Francisco, CA (US); Shannon Hale, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 32 days.

(21) Appl. No.: 12/943,884

(22) Filed: Nov. 10, 2010

(65) Prior Publication Data

US 2011/0225217 A1 Sep. 15, 2011

Related U.S. Application Data

(60) Provisional application No. 61/313,988, filed on Mar. 15, 2010.

(51) Int. Cl.
*G06F 17/30* (2006.01)
*G06F 7/00* (2006.01)
(52) U.S. Cl.
USPC .......................................... 707/825; 707/624
(58) Field of Classification Search
USPC ........................ 707/610, 776, 781, 784, 805
See application file for complete search history.

(56) References Cited

U.S. PATENT DOCUMENTS

| 7,209,929 | B2 * | 4/2007 | Dominguez et al. .......... 707/781 |
| 7,698,160 | B2 | 4/2010 | Beaven et al. |
| 7,949,684 | B2 * | 5/2011 | Brooks et al. ................. 707/802 |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 8,380,667 | B2 * | 2/2013 | Driesen ........................ 707/624 |
| 2003/0233404 | A1 | 12/2003 | Hopkins |
| 2005/0065925 | A1 * | 3/2005 | Weissman et al. ................ 707/4 |
| 2005/0223022 | A1 | 10/2005 | Weissman et al. |
| 2005/0283478 | A1 | 12/2005 | Choi et al. |
| 2006/0206834 | A1 * | 9/2006 | Fisher et al. .................. 715/777 |
| 2010/0070528 | A1 * | 3/2010 | Collins et al. ................. 707/776 |

OTHER PUBLICATIONS

U.S. Appl. No. 60/828,192, filed Oct. 4, 2006.

* cited by examiner

*Primary Examiner* — Sathyanarayan Pannala
(74) *Attorney, Agent, or Firm* — Zilka-Kotab, PC

(57) ABSTRACT

In accordance with embodiments, there are provided mechanisms and methods for deploying updates between environments of a multi-tenant on-demand database system. These mechanisms and methods for deploying updates between environments of a multi-tenant on-demand database system can enable embodiments to provide user-friendly, granular, and/or targeted updates between such environments.

21 Claims, 24 Drawing Sheets

Related Organizations

Related organizations are organizations that this organization is authorized to deploy migration packages to, or that are authorized to deploy migration packages to this organization.

Organizations That Can be Deployed To

| Action | Organization | Description | Last Deployment |
|---|---|---|---|
| Edit | Delete Production | Production org | Admin User, 11/30/2008 11:12 PM |
| Edit | Delete Config1 | External Dev | Admin User, 11/30/2008 11:12 PM |
| Edit | Delete HR Staging | HR recruiting app staging | Admin User, 11/30/2008 11:12 PM |

Organizations That Can Deploy to This Org

| Action | Organization | Description | Last Deployment |
|---|---|---|---|
| Edit | Delete Dev1 | Joe's developer org | Admin User, 11/30/2008 11:12 PM |

Help for this Page

FIG. 7A

Personal Setup
⊞ My Personal Information
⊞ Email
⊞ Import
⊞ Desktop Integration

App Setup
⊞ Customize
⊞ Create
⊞ Develop
⊟ Deploy
　Deployment Connections
　Outbound Change Sets
　Inbound Change Sets
　Monitor Deployments
　View Installed Packages

Administration Setup
⊞ Manage Users
⊞ Company Profile
⊞ Security Controls
⊞ Communication Templates
⊞ Data Management
⊞ Monitoring
⊞ Mobile Administration
⊞ Offline Administration *New!*
⊞ Email Administration
⊞ Google Apps

Deployment Connections                                         Help for this Page (?)

A deployment connection allows customizations to be copied from one organization to another. Each organization controls which connected organizations are authorized to upload changes to it.

The table below shows which organizations are authorized to upload changes to this organization, and which organizations allow this organization to upload changes to them.

This Organization: *acmewidgets.com (Enterprise Edition)*

Deployment Connections

| Action | Name | Description | Type | Upload Authorization Direction | Modified By |
|---|---|---|---|---|---|
| Edit | DIT | Staging sandbox for development integration and testing | Configuration Only Sandbox | acmewidgets.com ═══ DIT | John Smith, 4/27/2009 7:42 PM |
| Edit | Employee Success | Developer sandbox for new HR training application | Developer Sandbox | acmewidgets.com ⇔ Employee Success | John Smith, 4/24/2009 1:27 PM |
| Edit | Marketing Request | Developer sandbox for new Marketing Request application | Developer Sandbox | acmewidgets.com ⇒ Marketing Request | John Smith, 4/23/2009 6:32 PM |
| Edit | Sales Updates | Developer Sandbox for sales app customizations | Developer Sandbox | acmewidgets.com ⇐ Sales Updates | John Smith, 5/4/2009 1:10 PM |
| Edit | SIT | Staging sandbox for systems integration testing | Full Sandbox | acmewidgets.com ⇐ SIT | John Smith, 4/20/2009 8:11 PM |

Personal Setup
- My Personal Information
- Email
- Import
- Desktop Integration

App Setup
- Customize
- Create
- Develop
- Deploy
  - Deployment Connections
  - Outbound Change Sets
  - Inbound Change Sets
  - Monitor Deployments
  - View Installed Packages

Administration Setup
- Manage Users
- Company Profile
- Security Controls
- Communication Templates
- Data Management
- Monitoring
- Mobile Administration
- Offline Administration *New!*
- Email Administration
- Google Apps

---

Deployment Connections
Employee Success

Help for this Page (?)

* Back to List: Deployment Connections

A deployment connection allows customizations to be copied from one organization to another. Each organization controls which connected organizations are authorized to upload changes to it.

This Organization: acmewidgets.com (Enterprise Edition)

Deployment Connection Detail   [Edit]  [Upload Change Set]

| | | | |
|---|---|---|---|
| Name | Employee Success | | |
| Description | Developer sandbox for new HR training application | | |
| Type | Developer Sandbox | | |
| Created By | John Smith, 3/2/2009 6:31 PM | Modified By | John Smith, 3/2/2009 6:31 PM |

Upload Authorization Direction
Allow Inbound Changes ○ ☑      Accepts Outbound Changes ○ ☑

[Edit]  [Upload Change Set]

Outbound Change Set History

| Action | Change Set Name | Status | Uploaded By |
|---|---|---|---|
| View Results | Volunteering | Deployed in target organization | John Smith, 4/10/2009 9:16 PM |

Inbound Change Set History

No change sets have been uploaded from the connected organization.

Personal Setup
⊞ My Personal Information
⊞ Email
⊞ Import
⊞ Desktop Integration

App Setup
⊞ Customize
⊞ Create
⊞ Develop
⊟ Deploy
   Deployment Connections
   Outbound Change Sets
   Inbound Change Sets
   Monitor Deployments
   View Installed Packages

Administration Setup
⊞ Manage Users
⊞ Company Profile
⊞ Security Controls
⊞ Communication Templates
⊞ Data Management
⊞ Monitoring
⊞ Mobile Administration
⊞ Offline Administration *New!*
⊞ Email Administration
⊞ Google Apps

---

Edit Deployment Connections
SIT     <u>Help for this Page</u> ⓘ

Each organization controls which connected organizations are authorized to upload changes. Check Allow Inbound Changes to authorize the connected organization to upload changes to your organization. Contact the administrator responsible for deployment connections on the connected organization to authorize changes from your organization.

This Organization: *acmewidgets.com (Enterprise Edition)*

Deployment Connection Detail    [ Save ] [ Cancel ]

Name    SIT
 Description    Staging sandbox for systems integration testing
     Type    Full Sandbox

Upload Authorization Direction
Allow Inbound ○ ☑     Accepts Outbound ○ ☐
   Changes                             Changes

[ Save ] [ Cancel ]

Migration Packages

A migration package contains components such as apps, objects, reports or email templates. A migration package can be uploaded directly to another organization, where it can be confirmed and deployed by an administrator. The list below contains all packages created in this organization. To create a new migration package, click New.

Help for this Page ?

Migration Packages | New |

| Action | Package Name | Description | Modified By |
|--------|--------------|-------------|-------------|
| Edit | November - Final | November final release | Admin User, 11/30/2008 11:12 PM |
| Edit | June - Final | June final release | Admin User, 06/30/2008 11:12 PM |
| Edit | Preliminary Objects | Preliminary objects installation | Admin User, 06/28/2008 11:12 PM |

New

FIG. 9

Migration Package
November - Final

Help for this Page

A migration package contains components such as apps, objects, reports or email templates. A migration package can be uploaded directly to another organization, where it can be confirmed and deployed by an administrator. A migration package may be deployed to multiple organizations. Once the package has been deployed, the component list cannot be modified.

Migration Package Detail | Edit | Delete | Deploy | Create Copy |

Package Name: November - Final
Description: November final release
Created By: Admin User, 11/11/2008 11:52 AM    Modified By: Admin User, 11/30/2008 11:12 AM

| Edit | Delete | Deploy | Create Copy |

Package Components | Change Components |

| Name | Type | Object |
|---|---|---|
| Account Controller | Apex Class | |
| AltavistaNews | Custom Button or Link | Account |
| Dead Account | Email Template | |
| Financial Documents | Folder | |
| Time Off Manager | Home Page Component | |
| TimePicker | Visualforce Component | |
| Time Zones | Visualforce Page | |

| Change Components |

Deployment History

| Action | Target Organization | Status | Deployed By |
|---|---|---|---|
| | Production | Waiting for Authorization | Admin User, 11/30/2008 10:29 PM |
| View Log | HR-Staging | Deployed in Target Org | Admin User, 11/27/2008 8:45 AM |

Deploy Migration Package
November - Final

Help for this Page

Please choose the target organization for deployment. Once deployed, the administrators responsible for authorizing deployments in the target organization will be notified that there is a new migration package waiting.

| Package Details | | Deploy | Cancel |

Target Organization [ -- Choose -- ▼ ]

Deploy  Cancel

Migration Package Detail

| | | Delete | Deploy |
|---|---|---|---|
| Package Name | November - Final | | |
| Description | November final release | | |
| Created By | Admin User, 11/11/2008 11:52 AM | Modified By | Admin User, 11/30/2008 11:12 AM |

| | | Delete | Deploy |
|---|---|---|---|

Package Components

| Name | Type | Object |
|---|---|---|
| Account Controller | Apex Class | |
| Activate Subscription | Apex Trigger | |
| Activations | Custom App | |
| AltavistaNews | Custom Button or Link | Account |
| AltavistaNews | Custom Button or Link | Lead |
| Broadsheets | Custom Object Definition | |
| Broadsheets | Custom Report Type | |
| Broadsheets | Custom Tab Definition | |
| Cash Flow Projections | Dashboard | |
| Cash Flow Projections | Document | |
| Dead Account | Email Template | |
| Financial Documents | Folder | |
| Time Off Manager | Home Page Component | |
| TimePicker | Visualforce Component | |
| Time Zones | Visualforce Page | |

FIG. 15

Metadata Deployments

Active Deployments

| Job ID | Created By | Created Time | Status | Detail | Component Progress | Test Progress |
|---|---|---|---|---|---|---|
| 04sx0000000ch4 | Admin User | 2/17/2009 12:31 PM | Queued | | | |
| 04sx0000000Dwr | Bill Eidson | 2/17/2009 12:17 PM | In Progress | Deploying my_custom_obj__c.my_custom_field__c | 36 / 96 | 0 / 189 |
| 04sx0000000Dws | Jesper Joergensen | 2/17/2009 11:48 AM | In Progress | Running Test: my_apex_class.myTestMethod | 95 / 95 | 125 / 250 |

Completed Deployments

<u>Next Page ></u>

| Job ID | Created By | Created Time | Status | Components | Tests |
|---|---|---|---|---|---|
| 04s3000000007S8s | Colin Jarvis | 2/17/2009 11:18 AM | Completed | 43 | 11 |
| 04s3000000007SAU | Admin User | 2/17/2009 9:56 AM | Completed | 93 | 177 |
| 04s3000000007SA9 | Bill Eidson | 2/17/2009 9:17 AM | Completed | 9 | 21 |
| 04s3000000007SBC | Jesper Joergensen | 2/17/2009 8:22 AM | Completed | 13 | 62 |
| 04sx0000000Dwx | Colin Jarvis | 2/17/2009 7:39 AM | Failed | 37 | 164 |
| 04sx0000000Dwy | Admin User | 2/17/2009 4:31 AM | Completed | 56 | 184 |
| 04sx0000000Dwz | Bill Eidson | 2/17/2009 5:06 AM | Completed | 74 | 181 |
| 04sx0000000Dx0 | Jesper Joergensen | 2/17/2009 3:03 AM | Completed | 42 | 190 |

Metadata Deployment Results for job 04s300000007SAU

Deployment Summary

| | | | |
|---|---|---|---|
| Job ID | 04s300000007SAU | Components | 70 |
| Created By | Admin User | Deployed Components | 70 |
| Created | 2/17/2009 9:48 AM | Failed Components | 0 |
| Completed | 2/17/2009 9:56 AM | Total test time (ms) | 2869.0 |
| Total Run Time (min) | 8 | Test Failures | 1 |
| Status | Completed | Code coverage total % | NA |

Component Deployment Details

| Component Full Name | File Name | Result | Problem |
|---|---|---|---|
| AsyncDataLoader | classes/AsyncDataLoader.cls | No Change | |
| Blah | classes/Blah.cls | No Change | |
| DataLoader | classes/DataLoader.cls | No Change | |
| MassUpdateControllerExtension | classes/MassUpdateControllerExtension.cls | No Change | |
| WSTest | classes/WSTest.cls | No Change | |
| mheducationComOrderstatus | classes/mheducationComOrderstatus.cls | No Change | |
| CSV2SObject | classes/CSV2SObject.cls | Changed | |
| CalloutDataLoader | classes/CalloutDataLoader.cls | Changed | |
| MyAsyncTest | classes/MyAsyncTest.cls | Changed | |
| MyNewApexClass | classes/MyNewApexClass.cls | Created | |
| TestComcast | classes/TestComcast.cls | Changed | |
| MyVFComponent | components/MyVFComponent.component | No Change | |
| AsyncDataLoadMonitoring | pages/AsyncDataLoadMonitoring.page | No Change | |

FIG. 17

SYSTEM, METHOD AND COMPUTER PROGRAM PRODUCT FOR DEPLOYING AN UPDATE BETWEEN ENVIRONMENTS OF A MULTI-TENANT ON-DEMAND DATABASE SYSTEM

CLAIM OF PRIORITY

This application claims the benefit of U.S. Provisional Patent Application 61/313,988 entitled "Change Sets," by Plax et al., filed Mar. 15, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to application updates in an on-demand database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database network systems, migrating data from one location to another has typically involved simply copying the data from the first location to the second location. However, in some situations simply copying the data has been inefficient, or even incomplete. For example, where changes made to one environment are desired to be made to another environment, the techniques traditionally utilized for migrating such changes between the environments have been limited.

Some techniques used in the past have included a user manually rekeying the changes made in one environment to another environment, using a developer-centric software tool for uploading the changes made in one environment to another environment, etc. Unfortunately, these techniques have required a low-level of understanding by a user of components being changed, etc. Accordingly, it is desirable to provide improved techniques enabling updates between environments of database network systems.

BRIEF SUMMARY

In accordance with embodiments, there are provided mechanisms and methods for deploying updates between environments of a multi-tenant on-demand database system. These mechanisms and methods for deploying updates between environments of a multi-tenant on-demand database system can enable embodiments to provide user-friendly, granular, and/or targeted updates between such environments.

In an embodiment and by way of example, a method for deploying updates between environments of a multi-tenant on-demand database system is provided. In use, an update to a portion of an application implemented at a first environment of a multi-tenant on-demand database system is created. Further, an indication of a second environment of the multi-tenant on-demand database system to which the update is to be deployed is received. Moreover, the update is deployed to the second environment of the multi-tenant on-demand database system.

While one or more implementations and techniques are described with reference to an embodiment in which deploying updates between environments is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 7A-17 illustrate various screen shots illustrating exemplary user interface screens for deploying updates between environments of a multi-tenant on-demand, database system, in accordance with different embodiments;

DETAILED DESCRIPTION

General Overview

Systems and methods are provided for deploying updates between environments of a multi-tenant on-demand database system.

As used herein, the term multi-tenant database system, refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing deploying updates between environments of a multi-tenant on-demand database system will be described with reference to example embodiments.

Figure 1:
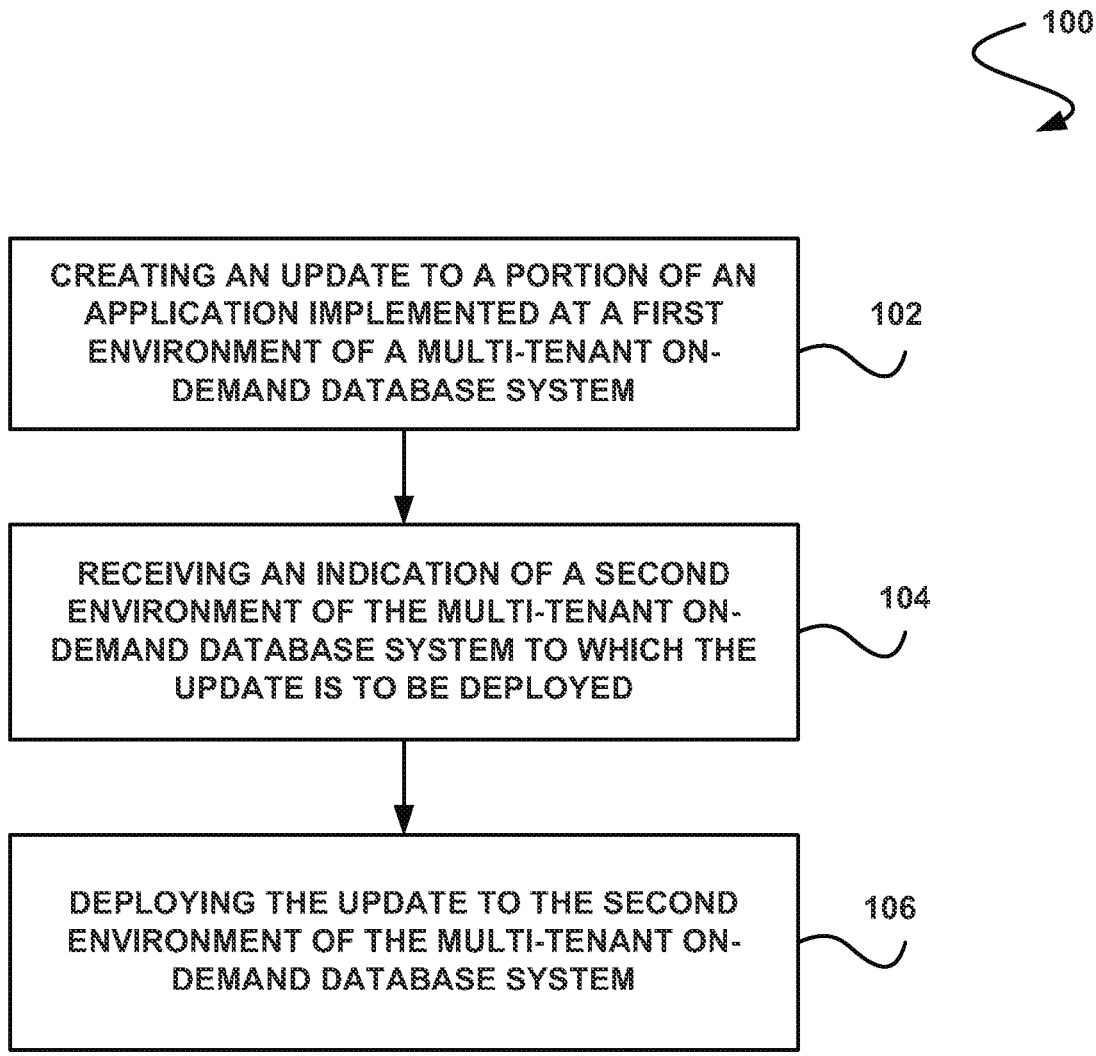
FIG. 1 illustrates a method for deploying updates between environments of a multi-tenant on-demand database system, in accordance with one embodiment.

FIG. 1 illustrates a method 100 for deploying updates between environments of a multi-tenant on-demand database system, in accordance with one embodiment. As shown in operation 102, an update to a portion of an application implemented at a first environment of a multi-tenant on-demand database system is created. As noted above, the multi-tenant database system may refer to a system in which various elements of hardware and software of the database system may be shared by one or more customers (e.g. tenants). Furthermore, the multi-tenant database system may be on-demand such that the various elements may be made available to the customers in an on-demand manner.

To this end, the first environment at which the update to the portion of the application is implemented may include any environment of the multi-tenant on-demand database system in which the application is created or installed, such that the application update may be implemented within the first environment. For example, the first environment may be specific to (e.g. customized for, solely utilized by, etc.) one of the customers. As another example, the first environment may include an organization of the multi-tenant on-demand database system implemented by the multi-tenant on-demand database system for the customer. More information regarding such organization is provided in detail with reference to the subsequent figures below.

In one exemplary embodiment, the first environment may include a sandbox environment (e.g. sandbox organization) utilized for testing the update implemented at the first environment. Thus, the first environment may implement the update to the portion of the application for testing purposes, such that the update may be tested (e.g. to verify functionality) prior to implementation thereof in another environment of the multi-tenant on-demand database system separate from the first environment, as described in more detail below.

It should be noted that the application for which the update is Implemented may include any software application for which an update may be implemented, where such application includes multiple portions (e.g. components, etc). Just by way of example, the application may include a graphical user interface (GUI) with multiple fields (e.g. for allowing a user to interface with a database, etc.), a database, a role hierarchy/sharing, etc.

Accordingly, the portion of the application may include a subpart of the application, such that the update may be implemented with respect to only the subpart of the application (e.g. and not necessarily an entirety of the application). Specifically, the portion of the application may include only a subset of the application to which a change was made at the first environment, such that other portions of the application dependent on the subset of the application may be excluded from the update. In various exemplary embodiments, the portion of the application for which the update is implemented may include user interface code, application logic, a data model, fields, record types, page layouts, buttons/links, list views, documents, dashboards email templates, and/or any other particular component of the application.

As an option, the update may be created utilizing a user interface (e.g. GUI) of the multi-tenant on-demand database system. For example, a user (e.g. associated with the aforementioned customer) may select the portion of the application to which an update (e.g. change, modification, etc.) was implemented at the first environment, utilizing the user interface. Thus, the user interface may allow the user to specify the particular portion of the application which was updated at the first environment. As another option, the update may be created as a package (e.g. in a predetermined format, etc.). Such package may include a metadata zip file, for example. In this way, the update may be created after implementation of the update to the portion of the application at the first environment, for deployment to another environment of the multi-tenant on-demand database system, as described below.

Additionally, as shown in operation 104, an indication of a second environment of the multi-tenant on-demand database system to which the update is to be deployed is received. With respect to the present description, the second environment may include any environment of the multi-tenant on-demand database system that is separate from the above described first environment and at which the update may be deployed. Thus, the second environment may have the application created or installed thereon, such that the update may be deployed on to the second environment for updating the instance of the application created or installed at the second environment. Optionally, the second environment may be associated with a same or different customer as the first environment.

For example, where the first environment includes a sandbox environment, as described above, the second environment may include a production environment (e.g. production organization) at which the application is available for use by the customer (or other tenant) of the multi-tenant on-demand database system. Of course, in another embodiment the second environment may include another sandbox environment utilized for testing the update upon deployment (e.g. implementation) at the second environment. With respect to such embodiment, the second environment may be a sandbox environment at which more stringent testing of the update is performed than at the first environment.

Further, the indication of the second environment may be received utilizing the above described user interface via which the update is received. For example, the indication of the second environment may be received in response to a selection (e.g. user selection) of the second environment. Optionally, the second environment may be selected from a predefined list of environments, where, in one embodiment, such predefined list of environments includes at least one environment preconfigured (e.g. by the tenant) to be authorized to receive updates from the first environment. As a further option, the predefined list of environments may be stored at the above described production environment, such that if the first environment includes a sandbox environment, the predefined list of environments may be stored remotely from the first environment and may further be remotely accessed by the first environment for the selection.

Moreover, as shown in operation 106, the update is deployed to the second environment of the multi-tenant on-demand, database system. With respect to the present description, deployment of the update may include any transmittal of the update to the second environment. For example, the updated portion of the application may be deployed to the second environment (e.g. such that only updated components of the application may be deployed, etc.).

In one exemplary embodiment, in response to receipt of the update, a row may be inserted in a table of the second environment, for indicating the receipt of the update and the receipt of the indication that the update is to be deployed to the second environment. Furthermore, the second environment may access the table to identify the update, such that information associated with the update may be displayed to a user based on the identification of the update from the access to the table. Moreover, the update may be deployed to the second environment in response to the user making a selection associated with the information displayed to the user instructing the deployment of the update. As an option, upon successful deployment of the update to the second environment or a predetermined amount of time after insertion of the aforementioned row in the table, the row may be deleted.

Accordingly, the second environment may receive the update, such that the second environment may implement (e.g. write) the update to the portion of the application at the second environment. By allowing the update implemented in the first environment with respect to the particular portion of the application to be deployed to the same particular portion of the application in the second environment, deploying an update for an entirety of the application when only the particular portion is to be updated at the second environment may be avoided. For example, particular components of the application which were updated at the first environment may be specified independently of one another, and such updated components may be deployed to the second environment for implementation thereof at the second environment.

Furthermore, by allowing the update to be deployed to a particular second environment in response to receipt of an indication of such second environment, the update may be deployed in a targeted manner. In this way, the update may be deployed to the second environment without necessarily broadcasting the update to other environments of the multi-tenant on-demand database system.

Still yet, by optionally allowing the update and the indication of the second environment to be received utilizing a user interface, the update may be deployed to the portion of the application at the second environment in a user-friendly manner. For example, developer-centric techniques may be avoided for such deployment, such as manually receding the portion of the application at the second environment, requiring user knowledge and understanding of components of the application and their functionality, etc.

Figure 2:
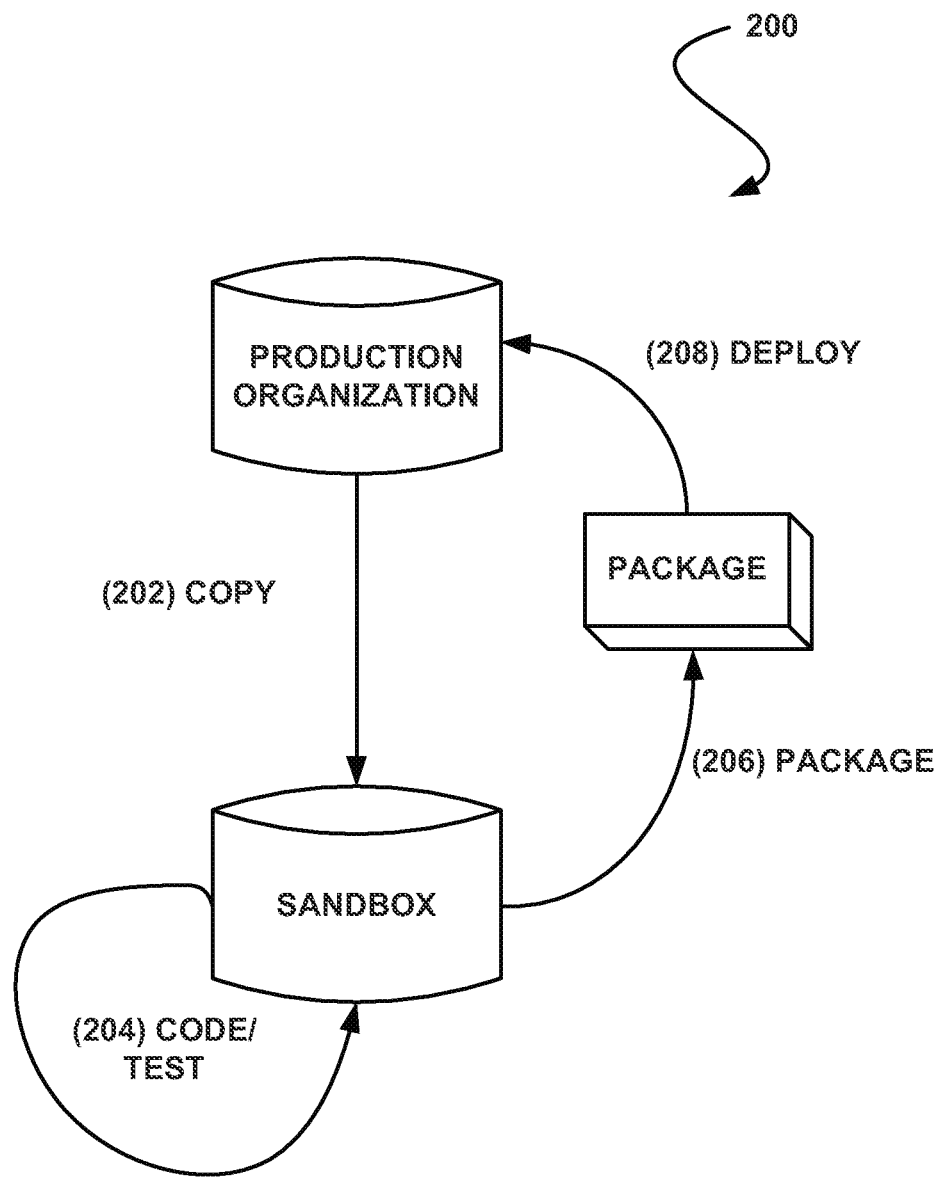
FIG. 2 illustrates a system for deploying updates between environments of a multi-tenant on-demand database system, in accordance with another embodiment.

FIG. 2 illustrates a system 200 for deploying updates between environments of a multi-tenant on-demand database system, in accordance with another embodiment. As an option, the present system 200 may be implemented in the context of the functionality of FIG. 1. For example, the system 200 may be implemented for carrying out the method 100 described above with respect to FIG. 1. Of course, however, the system 200 may be implemented in any desired environment. The aforementioned definitions may apply during the present description.

As shown, a copy of a production organization is sent to a sandbox organization (operation 202). The copy may include a copy of all databases, file systems, applications, etc. stored at the production organization. In this way, the sandbox organization may be a copy of the production organization (e.g. for use in development and/or testing of changes prior to implementation thereof at the production organization, etc.).

As also shown, an update to a portion of an application is developed (e.g. coded, as shown) and tested at the sandbox environment (operation 204). With respect to the present embodiment, the update may include a change to data stored by the sandbox organization. Specifically, the update may include a change to at least one component copied from the production organization to the sandbox organization (from operation 202).

Further, the update is packaged (operation 206) and deployed to the production organization (operation 208). For example, the update (e.g. the updated portion of the application) may be packaged for deployment thereof in response to validation of the update via the testing in operation 204. As another example, the update may be packaged for deployment to the production organization in response to user input. In particular, the user input may include a user selection of the portion of the application which has been updated and an indication by the user that the updated portion of the application is to be deployed to the production organization.

In this way, the update to the portion of the application that is implemented at the sandbox organization may be received for packaging thereof. It should be noted that packaging the update may include formatting the update according to a preconfigured format, in one embodiment. Moreover, the packaged update may be deployed to a targeted organization (which in the present embodiment is the production organization).

Figure 3:
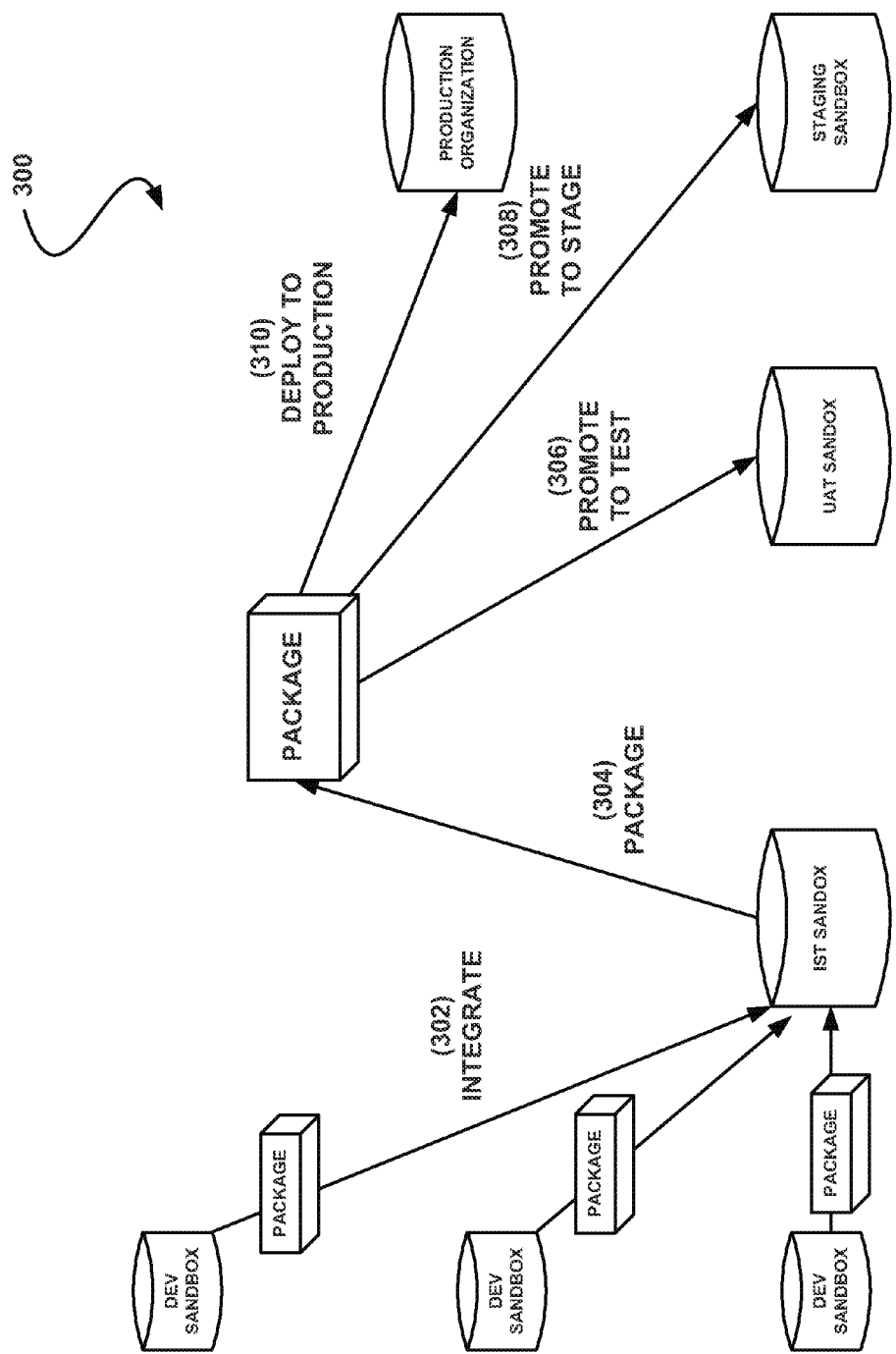
FIG. 3 illustrates a system for deploying updates between a plurality of environments of a multi-tenant on-demand database system, in accordance with another embodiment.

FIG. 3 illustrates a system 300 for deploying updates between a plurality of environments of a multi-tenant on-demand database system, in accordance with another embodiment. As an option, the present system 300 may be implemented in the context of the functionality of FIG. 1. For example, the system 300 may be implemented for carrying out the method 100 described above with respect to FIG. 1. Of course, however, the system 300 may be implemented in any desired environment. The aforementioned definitions may apply during the present description.

As shown, each of a plurality of development sandbox organizations (i.e. dev sandboxes, as shown) deploys a separate packaged update to an integration and system test (IST) sandbox organization (operation 302). In the present embodiment, the packaged updates may be deployed in the manner described above with respect to the method 100 of FIG. 1.

Further, each packaged update deployed from the respective development sandbox organization may include an update to a portion of an application that has been implemented (e.g. and tested, etc.) at the sandbox organization. Thus, the packaged updates deployed in operation 302 may include different updates (i.e. updates to different portions of a single application). It should be noted that with respect to the present embodiment, the development sandbox organizations may each include at least the portion of the application to which they have Implemented the update, and the IST sandbox organization may include each of such portions of the application included at the development sandbox organizations.

As specifically shown in operation 302, the packaged updates are deployed to the IST sandbox organization for integration thereof at the IST sandbox organization. Such integration may include combining the packaged updated into a single package in any desired manner. In one embodiment, the packaged updates may all be implemented at the IST sandbox organization. Optionally, the separate packaged updates may be tested in combination at the IST sandbox organization.

As noted above, the packaged updates are packaged into a single package. Such single package is then deployed to a user acceptance testing (UAT) sandbox organization (see operation 306). In particular, the single package may be deployed in the manner described above with respect to the method 100 of FIG. 1. In the present embodiment, the UAT sandbox organization may include at least the portions of the application included at the IST sandbox organization. In this way, the UAT sandbox organization may be utilized for implementing the updates included in the single package received from the IST sandbox organization and testing the same. For example, the UAT sandbox organization may allow user testing of the updates included in the single package.

Still yet, the single package is further deployed to a staging sandbox organization (operation 308). For example, the single package may be deployed from the UAT sandbox organization to the staging sandbox organization (using the method 100 of FIG. 1). In this way, any further changes implemented at the UAT sandbox organization may be packaged with the single package and deployed to the staging sandbox organization. In the present embodiment, the staging sandbox organization may include a copy of the application as installed at a production organization (via which users access the application), or may otherwise include components of the application not necessarily installed at the UAT sandbox organization. To this end, testing of an implementation of the single package at the staging sandbox organization may optionally be more thorough than testing performed at the UAT sandbox organization.

Moreover, the single package is deployed to the production organization (operation 310), using the method 100 of FIG. 1. For example, the single package (optionally including any changes implemented at the staging sandbox organization) may be deployed from the staging sandbox organization to the production organization, for allowing implementation of the single package at the production organization and thereby allowing users to use the application as updated via the single package. By promoting the separate updates developed at the development sandbox organizations through multiple other sandbox organizations (i.e. the IST sandbox organization, the UAT sandbox organization, the staging sandbox organization, as shown), the updates may be tested (and optionally changed) in multiple different environments which at least partially mimic the production organization via which the updates may be implemented for use by users.

Figure 4:
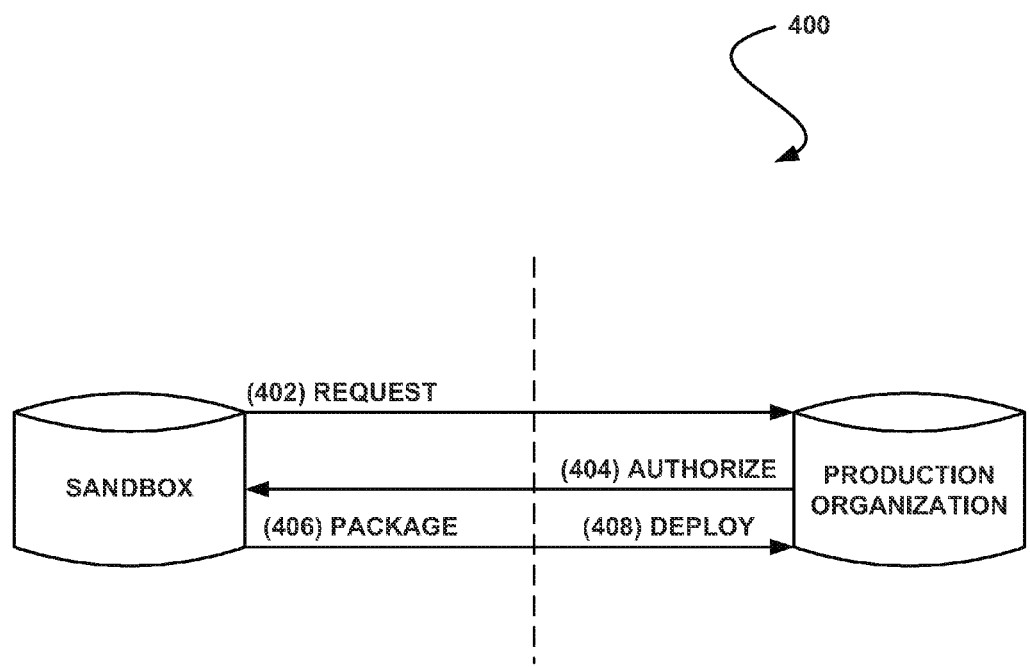
FIG. 4 illustrates a system for deploying updates between a sandbox environment and a production environment of a multi-tenant on-demand database system, in accordance with another embodiment.

FIG. 4 illustrates a system 400 for deploying updates between a sandbox environment and a production environment of a multi-tenant on-demand database system, in accordance with another embodiment. As an option, the present system 400 may be implemented in the context of the functionality of FIGS. 1-3. For example, the system 400 may be implemented for carrying out the method 100 described above with respect to FIG. 1. Of course, however, the system 400 may be implemented in any desired environment. Again, the aforementioned definitions may apply during the present description.

As shown in operation 402, a sandbox organization issues a request to a production organization. It should be noted that in the present embodiment, the sandbox organization includes a copy of at least a portion of an application created or installed at the production organization. Further, in the present embodiment, the request issued by the sandbox organization to the production organization includes a request to deploy to the production organization an update to the portion of the application implemented at the sandbox organization.

In one embodiment, the request may be issued utilizing an email message. For example, a user may request the deployment of the update from the sandbox organization to the production organization, as described in more detail below with reference to the subsequent figures. Thus, such request may include an indication that the update is to be deployed to the production organization. Of course, it should be noted that the request may be issued utilizing any desired communication medium existing between the sandbox organization and the production organization.

In response to receipt of the request, the production organization authorizes the deployment. For example, the production organization may determine that the sandbox organization is authorized to deploy updates to the production organization. Such determination may be made utilizing a predefined list of organizations to which the particular sandbox organization issuing the request is authorized is deploy updates. In one embodiment, the predefined list may be stored by the production organization. Further, the production organization may authorize the deployment by issuing an indication to the sandbox organization that the deployment is authorized, as shown in operation 404.

In response to receipt of the authorization, the sandbox organization packages the update (operation 406) and deploys the packaged update to the production organization (operation 408). In the present embodiment, such deployment may be performed utilizing the method 100 described above with respect to FIG. 1. Accordingly, the production organization may receive the package, and implement the update included therein.

Figure 5:
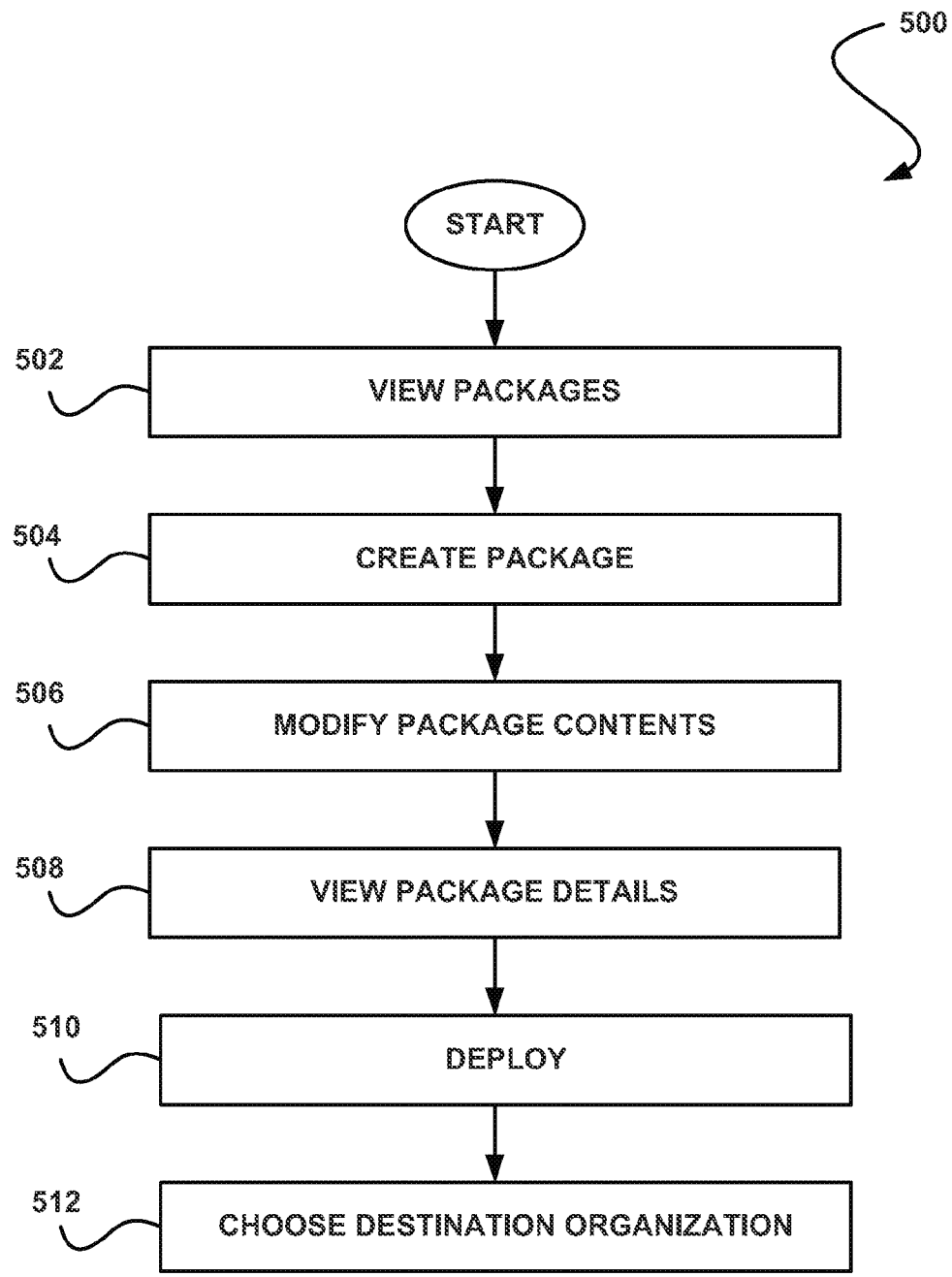
FIG. 5 illustrates a method for receiving an indication of an environment to which an update implemented at another environment is to be deployed, in accordance with another embodiment.

FIG. 5 illustrates a method 500 for receiving an indication of an environment to which an update implemented at another environment is to be deployed, in accordance with another embodiment. As an option, the present method 500 may be carried out in the context of the functionality of FIGS. 1-4. For example, the method 500 may be carried out utilizing the first environment described above with respect to FIG. 1. Of course, however, the method 200 may be carried out in any desired environment. The aforementioned definitions may apply during the present description.

It should be noted that the operations shown with respect to the present method 500 may or may not be carried out in the sequence shown, and may further be carried out alone or in conjunction with one another. As shown in operation 502, a plurality of packages is viewed. With respect to the present embodiment, the packages each include a different update to a portion of an application which has been implemented at a first environment of a multi-tenant on-demand database system. Thus, each package may be for a different application, for a different portion of a single application, etc.

In particular, the packages may be viewed by a user utilizing a GUI listing packaged updates which have been developed (e.g. at a particular organization via which the packages are being viewed). One example of the GUI which may be utilized for viewing the packages is shown in FIG. 9. For example, as shown in FIG. 9, the GUI 900 may include for each listed package the package name, a description of the update included in the package, a name of a user that last modified the package, a date of such modification, and an option to edit the package.

Figure 10:
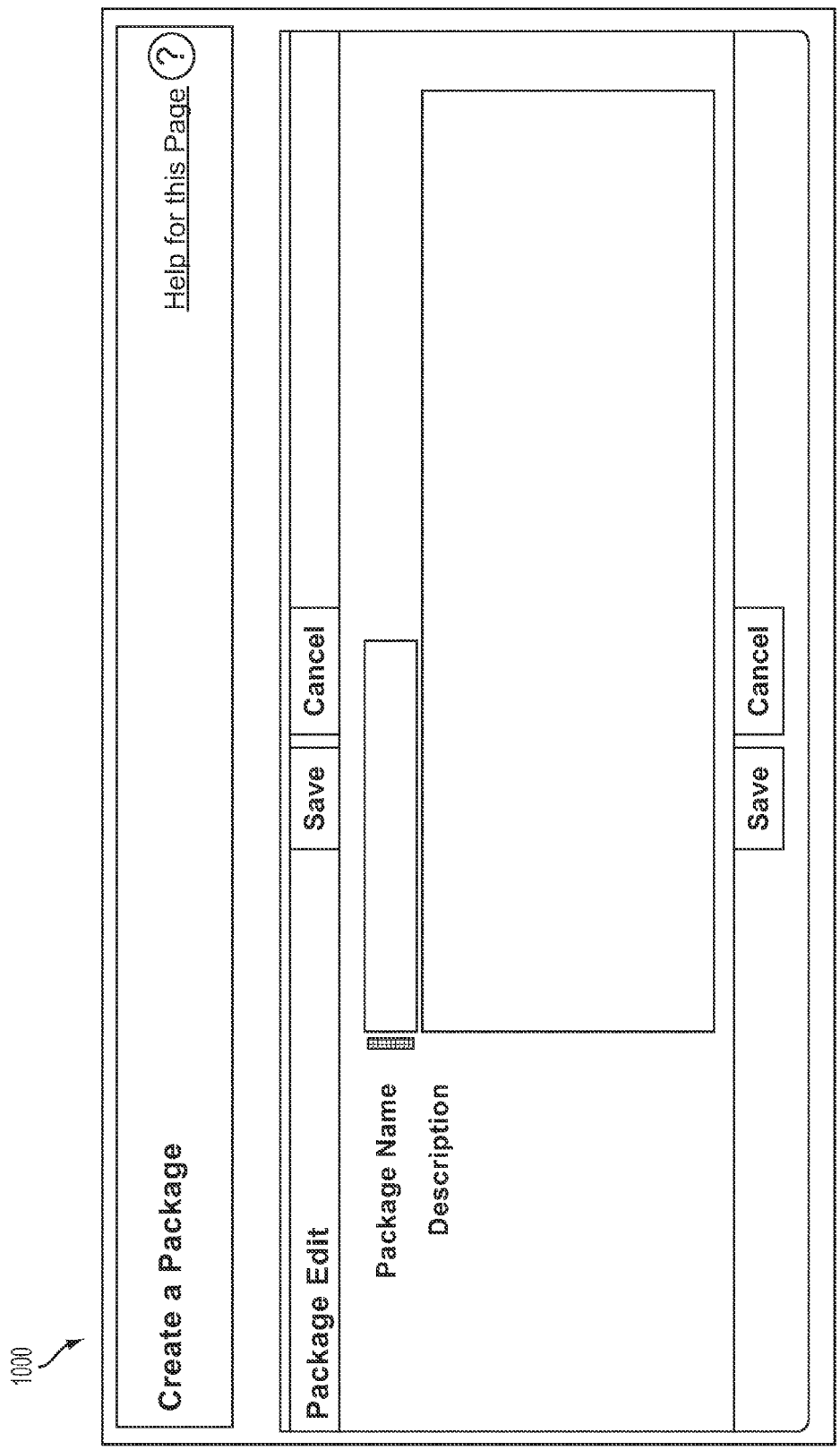

Further, a package is created, as shown in operation 504. It should be noted that operation 504 may be optional with respect to the present method 500. For example, from the GUI 900 described above, a user may select an option to create a new package (operation 504) or to view details of an existing package listed in operation 502, as described below. FIG. 10 illustrates one example of a GUI 1000 which may be utilized for creating a new package, in which a user enters a name for the package and a description of the package (e.g. to be utilized when listing available packages via the GUI 900 shown in FIG. 9). As another option, the user may create a new package from an existing package (e.g. by cloning the existing package into a new package).

Figure 11:

It should be noted that the following operations 506-512 may be performed with respect to the newly created package (from operation 504) or one of the existing packages viewed in operation 502 (e.g. upon selection thereof). As shown, package contents are modified (operation 506). The package contents being modified may include contents of the package newly created in operation 504 or one of the existing packages listed in operation 502. With respect to the present embodiment, modifying the package contents may include adding or removing portions (e.g. components) of an application which have been updated and which may be deployed to another organization. Just by way of example, FIG. 11 illustrates a GUI 1100 for allowing a user to select which portions of an application are to be included in the package. The GUI 1100 in FIG. 11 lists each portion of an application, a type of the portion, an object included In the portion, and a date in which the portion was last updated.

In another embodiment, the user may create an ad hoc list of components to be included in the package. The use may further view components recommend to be included in the package, based on components specified by the user (e.g. spider determined) and optionally include these individually. As another option, the packaging metadata spider may automatically add all dependent metadata to the package (e.g. for eliminating dangling references).

In another embodiment, the user may compare the organization utilized for creating the package (i.e. the source organization) against another organization (i.e. the target organization) to determine which components are new, changed, or missing, in order to decide which components to deploy to the other organization. For each component in the source organization, the user may decide whether to include it, and the comparison may provide the additional ability to delete components from the target organization that are absent from the source organization. Optionally, conflict detection and resolution within an individual component may be provided, to ensure more recent changes to the target organization are not unintentionally overwritten via deployment of the package (e.g. something new that was created in the target organization since the source organization was copied from the target organization). Timestamps may be utilized for performing such conflict detection.

In yet another embodiment, the user may view a snapshot the source organization, make changes, and compare the current metadata state of the source organization to an earlier snapshot. From that comparison, the user may decide what to include in the package.

In addition, package details are viewed, as shown in operation 508. The package details may include portions of the application included in the package, a history of deployment of the package (e.g. an organization to which the package was requested to be deployed, a status of the deployment, etc.), dependencies within portions of the package, etc. FIG. 12 illustrates an example of a GUI 1200 which may be utilized for viewing details of a package.

Still yet, the package is requested to be deployed (operation 510). Optionally, a user may utilize a GUI to request deployment of the package. In response to a request to deploy the package, a destination organization to which the package is to be deployed is chosen (operation 512). For example, a GUI may be presented for allowing the user to choose a destination organization to which the package is to be deployed. FIG. 13 illustrates one example of a GUI 1300 which may be utilized for selecting the destination organization.

Figure 7B:
Figure 8B:
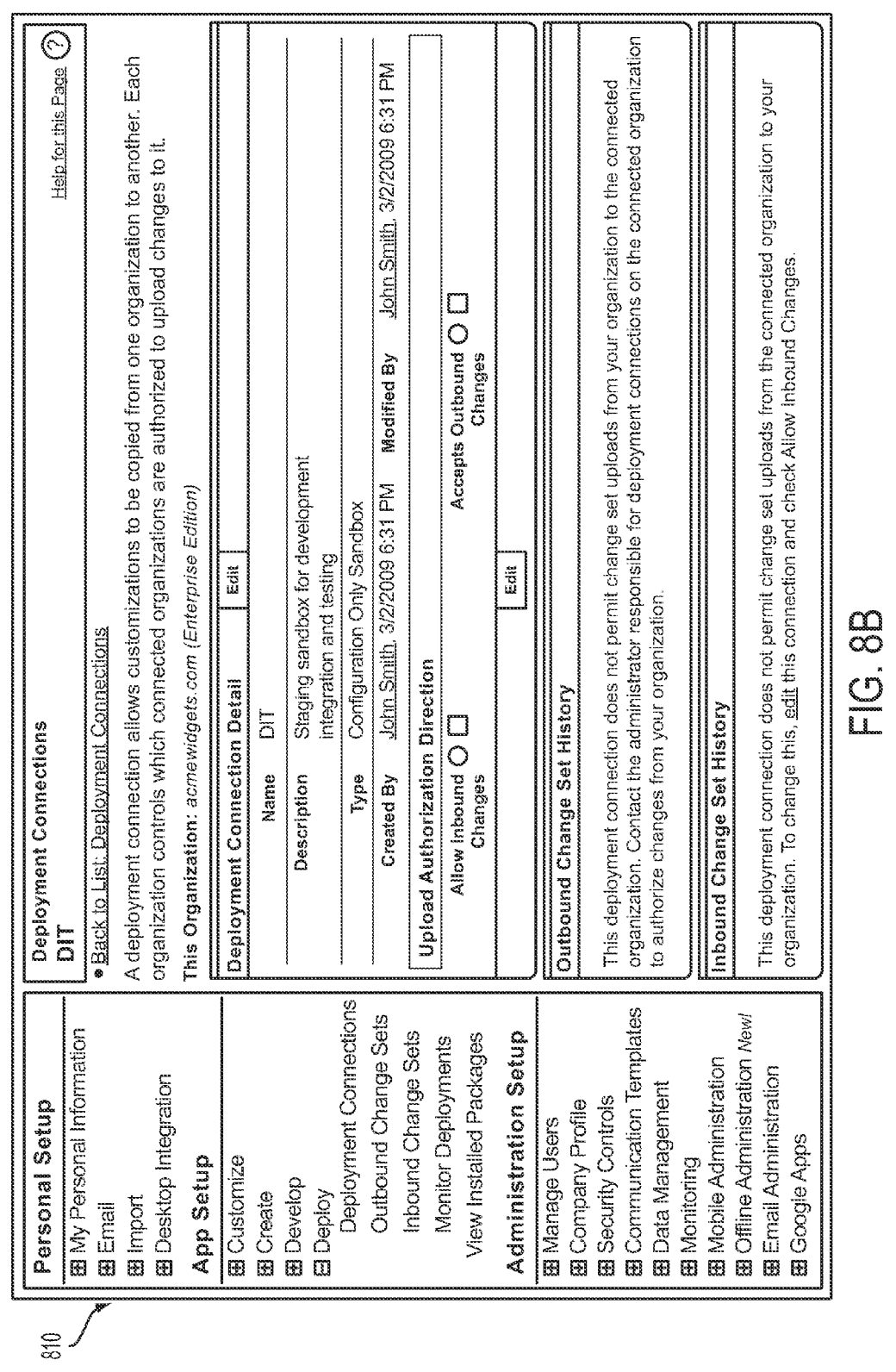

As an option, only organizations previously authorized to receive updates from the organization carrying out the present method 500 may be provided for selection therefrom. The GUI 700 shown in FIG. 7A (and in another embodiment the GUI 800 shown in FIG. 8A) illustrates an interface displaying, with respect to the organization carrying out the present method 500, related organizations, including the organizations to which an update may be deployed and the organizations from which an update may be received. Further, FIG. 7B illustrates a GUI 710 (and respectively the GUI 810 of FIG. 8B) presenting details of a related organization (e.g. which may be displayed upon selection of one of the organizations listed in the GUI 700, 800 described above). The organizations with which the deploying organization is related may be configured or otherwise modified utilizing the GUI 840 of FIG. 8E, as an option.

Figure 8D:

Moreover, FIG. 8C illustrates a GUI 820 showing a deployment history of the organization carrying out the present method 500 with respect to one of the related organizations to which such organization is authorized to deploy updates. FIG. 8D illustrates a GUI 820 showing a history of updates received by the organization carrying out the present method 500 with respect to one of the related organizations from which such organization is authorized to receive updates.

As another option, once the organization to which the package is to be deployed is chosen, the package may be uploaded for deployment to the chosen organization. For example, the package may be uploaded to a queue of the multi-tenant on-demand database center, and may further be deployed to the chosen organization from the queue (e.g. the in the manner described below with respect to the method 600 of FIG. 6). As a further option, once the package is uploaded for deployment, it may automatically become read-only, such that further changes thereto may be prevented. As yet another option, upon upload of the package, an email may be sent to a user of the chosen organization for notifying such user of the uploaded package (e.g. such that the user may select to deploy the package to the chosen organization).

Figure 6:
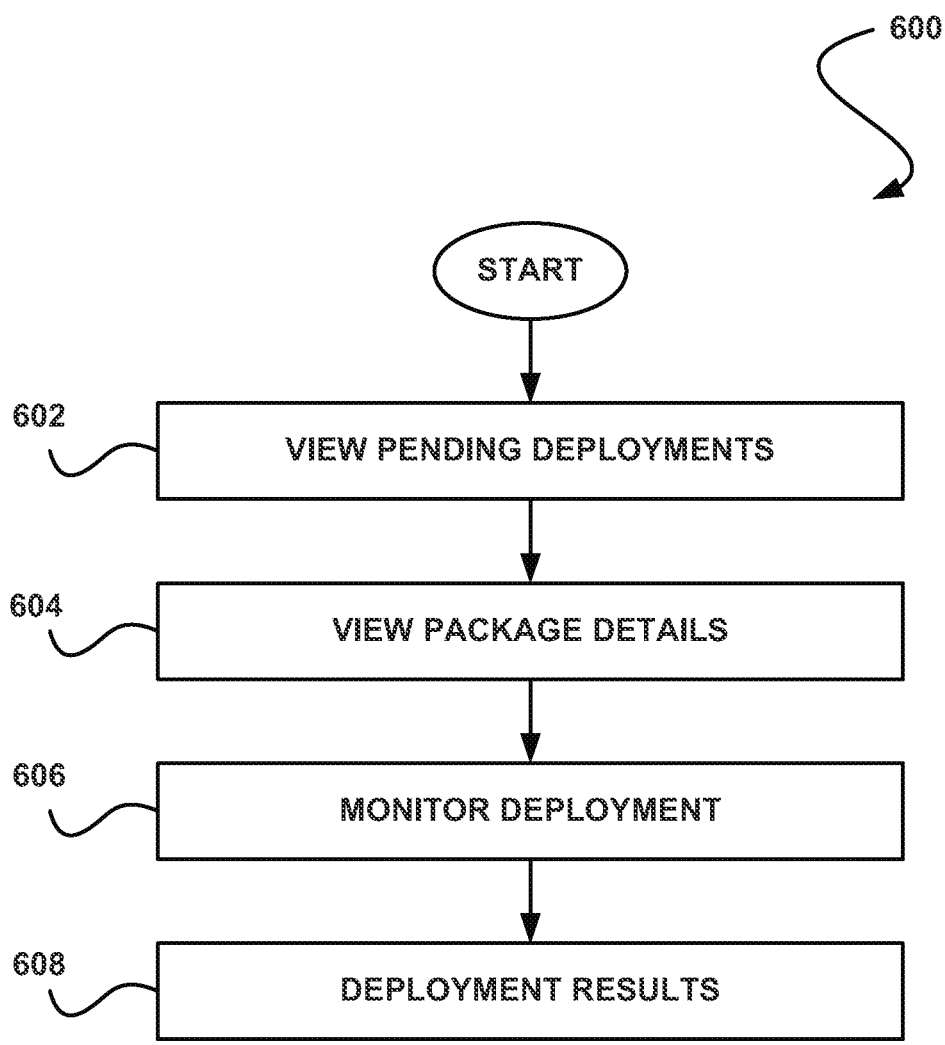
FIG. 6 illustrates a method for deploying to one environment an update implemented at another environment, in accordance with yet another embodiment.

FIG. 6 illustrates a method 600 for deploying to one environment an update implemented at another environment, in accordance with yet another embodiment. As an option, the present method 600 may be carried out in the context of the functionality of FIGS. 1-5. For example, the method 600 may be carried out by the second environment described above with respect to FIG. 1 and subsequent to the method 500 of FIG. 5. Of course, however, the method 600 may be carried out in any desired environment. Yet again, the aforementioned definitions may apply during the present description.

Figure 14:

It should be noted that the operations shown with respect to the present method 600 may or may not be carried out in the sequence shown, and may further be carried out alone or in conjunction with one another. As shown in operation 602, pending deployments are viewed. The pending deployments may include any updates requested to be deployed to a particular organization via which the pending deployments are being viewed. For example, the pending deployments may include updates requested to be deployed via the method 500 of FIG. 5. FIG. 14 illustrates one example of a GUI 1400 which may be utilized for viewing pending deployments. In various embodiments, the information displayed for presenting the pending deployments may include a name of the package for which deployment is pending, a description of the package, a status of the deployment, a name of a user that developed the package, a name of a user that requested the deployment, the organization from which the deployment was requested, a list of components in the package, etc.

Additionally, package details are viewed. Note operation 604. With respect to the present embodiment, the package details include details of one of the updates for which deploying is pending (listed in operation 602). The GUI 1500 shown in FIG. 15 illustrates an example of a presentation of such package details.

Furthermore, deployment is monitored, as shown in operation 606. For example, a status of each package selected to be deployed (e.g. selected from the pending deployments listed in operation 602) may be monitored. A GUI (e.g. the GUI 1600 in FIG. 16) may display each package selected to be deployed and the status thereof, such as whether the deployment is queued, in progress (and optionally a specific point of the progress), completed, etc.

Moreover, deployment results are viewed. Note operation 608. The deployment results may be viewed for a particular one of the packages selected for deployment (e.g. see the GUI 1700 of FIG. 17), or for all packages selected for deployment. The results may indicate for each portion of the application to which the package was deployed, whether the portion was changed (e.g. updated) via the deployment, etc. Optionally, any failure reasons (e.g. missing dependency, test failure, etc.) may be communicated back to the organization from which the package was deployed, for allowing a user to fix any problems resulting in the failures and upload a new fixed package.

System Overview

Figure 18:
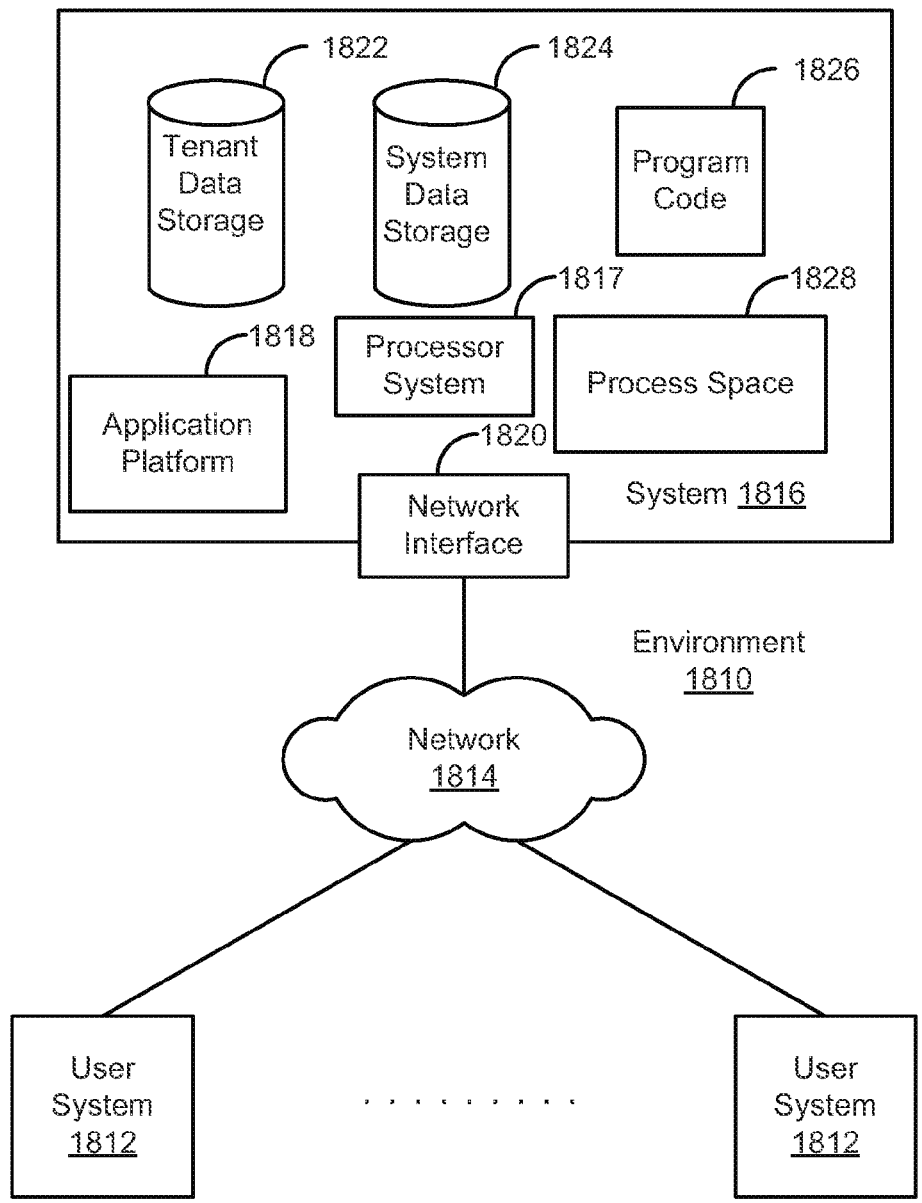
FIG. 18 illustrates a block diagram of an example of an environment wherein an on-demand database system might, be used.

FIG. 18 illustrates a block diagram of an environment 1810 wherein an on-demand database service might be used. Environment 1810 may include user systems 1812, network 1814, system 1816, processor system 1817, application platform 1818, network interface 1820, tenant data storage 1822, system data storage 1824, program code 1826, and process space 1828. In other embodiments, environment 1810 may not have all of the components listed and/or may have other elements instead of, or in addition to, those listed above.

Environment 1810 is an environment in which an on-demand database service exists. User system 1812 may be any machine or system that is used by a user to access a database user system. For example, any of user systems 1812 can be a handheld computing device, a mobile phone, a laptop computer, a work station, and/or a network of computing devices. As illustrated in FIG. 18 (and in more detail in FIG. 19) user systems 1812 might interact via a network 1814 with an on-demand database service, which is system 1816.

An on-demand database service, such as system 1816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1816" and "system 1816" will be used interchangeably herein. A database image may include one or more database objects. A relational database management system (RDMS) or the equivalent may execute storage and retrieval of information against the database object(s). Application platform 1818 may be a framework that allows the applications of system 1816 to run, such as the hardware and/or software, e.g., the operating system. In an embodiment, on-demand database service 1816 may include an application platform 1818 that enables creation, managing and executing one or more applications developed by the provider of the on-demand database service, users accessing the on-demand database service via user systems 1812, or third party application developers accessing the on-demand database service via user systems 1812.

The users of user systems 1812 may differ in their respective capacities, and the capacity of a particular user system 1812 might be entirely determined by permissions (permission levels) for the current user. For example, where a salesperson is using a particular user system 1812 to interact with system 1816, that user system has the capacities allotted to that salesperson. However, while an administrator is using that user system to interact with system 1816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1814 is any network or combination of networks of devices that communicate with one another. For example, network 1814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1812 might communicate with system 1816 using TCP/IP and, at a higher network level, use other common Internet protocols to communicate, such as HTTP, FTP, AFS, WAP, etc. In an example where HTTP is used, user system 1812 might include an HTTP client commonly referred to as a "browser" for sending and receiving HTTP messages to and from an HTTP server at system 1816. Such an HTTP server might be implemented as the sole network interface between system 1816 and network 1814, but other techniques might be used as well or instead. In some implementations, the interface between system 1816 and network 1814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1816, shown in FIG. 18, implements a web-based customer relationship management (CRM) system. For example, in one embodiment, system 1816 includes application servers configured to implement and execute CRM software applications as well as provide related data, code, forms, webpages and other information to and from user systems 1812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1816 implements applications other than, or in addition to, a CRM application. For example, system 1816 may provide tenant access to multiple hosted (standard and custom) applications, including a CRM application. User (or third party developer) applications, which may or may not include CRM, may be supported by the application platform 1818, which manages creation, storage of the applications into one or more database objects and executing of the applications in a virtual machine in the process space of the system 1816.

One arrangement for elements of system 1816 is shown in FIG. 18, including a network interface 1820, application platform 1818, tenant data storage 1822 for tenant data 1823, system data storage 1824 for system data 1825 accessible to system 1816 and possibly multiple tenants, program code 1826 for implementing various functions of system 1816, and a process space 1828 for executing MTS system processes and tenant-specific processes, such as running applications as part of an application hosting service. Additional processes that may execute on system 1816 include database indexing processes.

Several elements in the system shown in FIG. 18 include conventional, well-known elements that are explained only briefly here. For example, each user system 1812 could include a desktop personal computer, workstation, laptop, PDA, cell phone, or any wireless access protocol (WAP) enabled device or any other computing device capable of interfacing directly or indirectly to the Internet or other network connection. User system 1812 typically runs an HTTP client, e.g., a browsing program, such as Microsoft's Internet Explorer browser, Netscape's Navigator browser, Opera's browser, or a WAP-enabled browser in the case of a cell phone. PDA or other wireless device, or the like, allowing a user (e.g., subscriber of the multi-tenant database system) of user system 1812 to access, process and view information, pages and applications available to it from system 1816 over network 1814. Each user system 1812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1816 or other systems or servers. For example, the user interface device can be used to access data and applications hosted by system 1816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1812 and all of its components are operator configurable using applications, such as a browser, including computer code run using a central processing unit such as an Intel Pentium® processor or the like. Similarly, system 1816 (and additional instances of an MTS, where more than one is present) and ail of their components might be operator configurable using application(s) including computer code to ran using a central processing unit such as processor system 1817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1816 is configured to provide webpages, forms, applications, data and media content to user (client) systems 1812 to support the access by user systems 1812 as tenants of system 1816. As such, system 1816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 19:
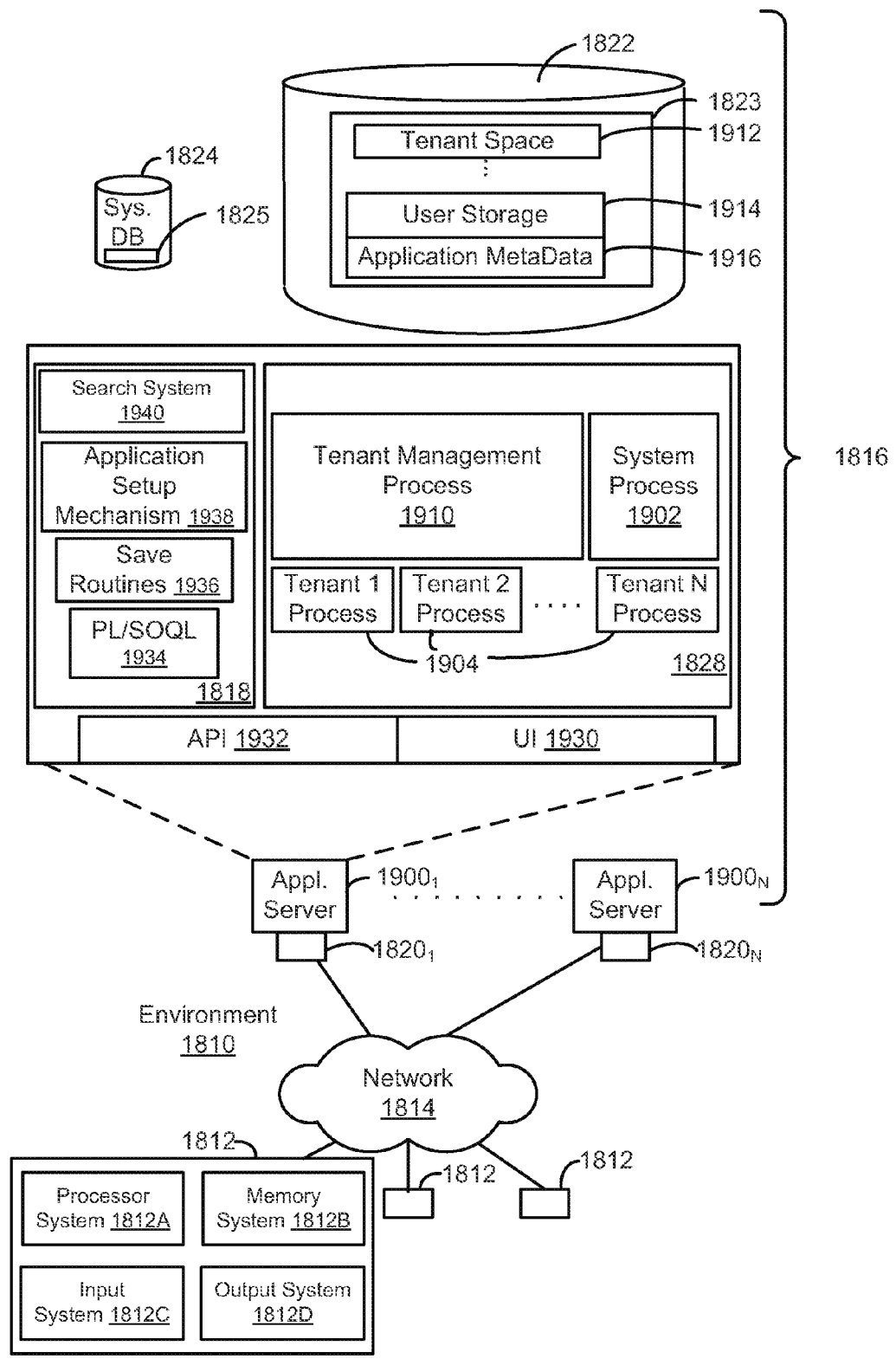
FIG. 19 illustrates a block diagram of an embodiment of elements of FIG. 18 and various possible interconnections between these elements.

FIG. 19 also illustrates environment 1810. However, in FIG. 19 elements of system 1816 and various interconnections in an embodiment are further illustrated. FIG. 19 shows that user system 1812 may include processor system 1812A, memory system 1812B, input system 1812C, and output system 1812D. FIG. 19 shows network 1814 and system 1816.

FIG. 19 also shows that system 1816 may include tenant data storage 1822, tenant data 1823, system data storage 1824, system data 1825, User Interface (UI) 1930, Application Program Interface (API) 1932, PL/SOQL 1934, save routines 1936, application setup mechanism 1938, applications servers 1900$_1$-1900$_N$, system process space 1902, tenant process spaces 1904, tenant management process space 1910, tenant storage area 1912, user storage 1914, and application metadata 1916. In other embodiments, environment 1810 may not have the same elements as those listed above and/or may have other elements instead of, or in addition to, those listed above.

User system 1812, network 1814, system 1816, tenant data storage 1822, and system data storage 1824 were discussed above in FIG. 18. Regarding user system 1812, processor system 1812A may be any combination of one or more processors. Memory system 1812B may be any combination of one or more memory devices, short term, and/or long term memory. Input system 1812C may be any combination of input devices, such as one or more keyboards, mice, trackballs, scanners, cameras, and/or interfaces to networks. Output system 1812D may be any combination of output devices, such as one or more monitors, printers, and/or interfaces to networks. As shown by FIG. 19, system 1816 may include a network interface 1820 (of FIG. 18) implemented as a set of HTTP application servers 1900, an application platform 1818, tenant data storage 1822, and system data storage 1824. Also shown is system process space 1902, including individual tenant process spaces 1904 and a tenant management process space 1910. Each application server 1900 may be configured to tenant data storage 1822 and the tenant data 1823 therein, and system data storage 1824 and the system data 1825 therein to serve requests of user systems 1812. The tenant data 1823 might be divided into individual tenant storage areas 1912, which can be either a physical arrangement and/or a logical arrangement of data. Within each tenant storage area 1912, user storage 1914 and application metadata 1916 might be similarly allocated for each user. For example, a copy of a user's most recently used (MRU) items might be stored to user storage 1914. Similarly, a copy of MRU items for an entire organization that is a tenant might be stored to tenant storage area 1912. A UI 1930 provides a user interface and an API 1932 provides an application programmer interface to system 1816 resident processes to users and/or developers at user systems 1812. The tenant data and the system data may be stored in various databases, such as one or more Oracle™ databases.

Application platform 1818 includes an application setup mechanism 1938 that supports application developers' creation and management of applications, which may be saved as metadata into tenant data storage 1822 by save routines 1936 for execution by subscribers as one or more tenant process spaces 1904 managed by tenant management process 1910 for example. Invocations to such applications may be coded using PL/SOQL 1934 that provides a programming language style interface extension to API 1932. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1916 for the subscriber making the invocation and executing the metadata as an application in a virtual machine.

Each application server 1900 may be communicably coupled to database systems, e.g., having access to system data 1825 and tenant data 1823, via a different network connection. For example, one application server 1900$_1$ might be coupled via the network 1814 (e.g., the Internet), another application server 1900$_{N-1}$ might be coupled via a direct network link, and another application server 1900$_N$ might be coupled by yet a different network connection. Transfer Control Protocol and Internet Protocol (TCP/IP) are typical protocols for communicating between application servers 1900 and the database system. However, it will be apparent to one skilled in the art that other transport protocols may be used to optimize the system depending on the network interconnect used.

In certain embodiments, each application server 1900 is configured to handle requests for any user associated with any organization that is a tenant. Because it is desirable to be able to add and remove application servers from the server pool at any time for any reason, there Is preferably no server affinity for a user and/or organization to a specific application server 1900. In one embodiment, therefore, an interface system implementing a load balancing function (e.g., an F5 Big-IP load balancer) is communicably coupled between the application servers 1900 and the user systems 1812 to distribute requests to the application servers 1900. In one embodiment, the load balancer uses a least connections algorithm to route user requests to the application servers 1900. Other examples of load balancing algorithms, such as round robin and observed response time, also can be used. For example, in certain embodiments, three consecutive requests from the same user could hit three different application servers 1900, and three requests from different users could hit the same application server 1900. In this manner, system 1816 is multi-tenant, wherein system 1816 handles storage of, and access to, different objects, data and applications across disparate users and organizations.

As an example of storage, one tenant might be a company that employs a sales force where each salesperson uses system 1816 to manage their sales process. Thus, a user might maintain contact data, leads data, customer follow-up data, performance data, goals and progress data, etc., all applicable to that user's personal sales process (e.g., in tenant data storage 1822). In an example of a MTS arrangement, since ail of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1816 might also maintain system level data usable by multiple tenants or other data. Such system level data might include industry reports, news, postings, and the like that are sharable among tenants.

In certain embodiments, user systems 1812 (which may be client systems) communicate with application servers 1900 to request and update system-level and tenant-level data from system 1816 that may require sending one or more queries to tenant data storage 1822 and/or system data storage 1824. System 1816 (e.g., an application server 1900 in system 1816) automatically generates one or more SQL statements (e.g., one or more SQL queries) that are designed to access the desired information. System data storage 1824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium including instructions stored therein which can be used to program a computer to perform any of the processes of the embodiments described below:

changing a portion of an application implemented at a first environment of a multi-tenant on-demand database system to include an update, where the first environment includes a first organization implemented by the multi-tenant on-demand database system;

testing the portion of the application that includes the update to verify a functionality of the update within the first environment;

receiving an indication of a second environment of the multi-tenant on-demand database system to which the update is to be deployed, where the second environment includes a second organization implemented by the multi-tenant on-demand database system;

creating a package that includes the update after verifying the functionality of the update within the first environment;

inserting a row in a table of the second environment in response to receipt of the update, for indicating the receipt of the update and the receipt of the indication that the update is to be deployed to the second environment;

accessing the table to identify the update;

displaying to a user information associated with the update, based on the identification of the update;

receiving from the user a selection instructing a deployment of the package; and deploying the package including the update to the second environment of the multi-tenant on-demand database system, in response to the selection.

2. The computer program product of claim 1, wherein the portion of the application includes at least one of user interface code, application logic, and a data model.

3. The computer program product of claim 1, wherein the first environment includes a sandbox environment utilized for the testing of the update included within the portion of the application at the first environment.

4. The computer program product of claim 1, wherein the computer program product is operable such that the update is created utilizing a user interface of the multi-tenant on-demand database system.

5. The computer program product of claim 4, wherein the computer program product is operable such that a user selects the portion of the application into which the update was included at the first environment, utilizing the user interface.

6. The computer program product of claim 1, wherein the portion of the application includes only a subset of the application to which a change was made at the first environment, such that other portions of the application dependent on the subset of the application are excluded from the update.

7. The computer program product of claim 1, wherein the second environment includes a production environment at which the application is available for use by at least one tenant of the multi-tenant on-demand database system.

8. The computer program product of claim 1, wherein the second environment includes a sandbox environment utilized for further testing the update upon implementation at the second environment.

9. The computer program product of claim 1, wherein the computer program product is operable such that the indication of the second environment is received in response to a selection of the second environment.

10. The computer program product of claim 9, wherein the computer program product is operable such that the second environment is selected from a predefined list of environments.

11. The computer program product of claim 10, wherein the predefined list of environments includes at least one environment preconfigured to be authorized to receive updates from the first environment.

12. The computer program product of claim 10, wherein the computer program product is operable such that the predefined list of environments is stored remotely from the first environment and is remotely accessed by the first environment for the selection.

13. The computer program product of claim 1, wherein deploying the package to the second environment includes transmitting the package to the second environment for implementing the update to the portion of the application at the second environment.

14. The computer program product of claim 1, wherein the first organization is specific to a customer of the multi-tenant on-demand database system by the multi-tenant on-demand database system customizing the first organization for the customer and implementing the first organization by the multi-tenant on-demand database system for sole use by the customer.

15. The computer program product of claim 14, wherein the second organization is associated with the customer.

16. The computer program product of claim 14, wherein the second organization is associated with another customer.

17. The computer program product of claim 1, wherein the second organization is a production organization and the first organization is a sandbox organization that is a copy of the production organization by including a copy of data stored at the production organization, such that the sandbox organization is for use in the creation and testing of the update to the portion of the application prior to the deployment and implementation of the package to the production organization.

18. The computer program product of claim 1, wherein the first organization is a copy of the second organization and includes a copy of all databases, file systems, and applications stored at the second organization.

19. A method, comprising:
changing a portion of an application implemented at a first environment of a multi-tenant on-demand database system to include an update, where the first environment includes a first organization implemented by the multi-tenant on-demand database system;
testing the portion of the application that includes the update to verify a functionality of the update within the first environment, utilizing a hardware processor;
receiving an indication of a second environment of the multi-tenant on-demand database system to which the update is to be deployed, where the second environment includes a second organization implemented by the multi-tenant on-demand database system;
creating a package that includes the update after verifying the functionality of the update within the first environment;
inserting a row in a table of the second environment in response to receipt of the update, for indicating the receipt of the update and the receipt of the indication that the update is to be deployed to the second environment;
accessing the table to identify the update;
displaying to a user information associated with the update, based on the identification of the update;
receiving from the user a selection instructing a deployment of the package; and
deploying the package including the update to the second environment of the multi-tenant on-demand database system, in response to the selection.

20. An apparatus, comprising:
a processor for:
changing a portion of an application implemented at a first environment of a multi-tenant on-demand database system to include an update, where the first environment includes a first organization implemented by the multi-tenant on-demand database system;
testing the portion of the application that includes the update to verify a functionality of the update within the first environment;
receiving an indication of a second environment of the multi-tenant on-demand database system to which the update is to be deployed, where the second environment includes a second organization implemented by the multi-tenant on-demand database system;
creating a package that includes the update after verifying the functionality of the update within the first environment;
inserting a row in a table of the second environment in response to receipt of the update, for indicating the receipt of the update and the receipt of the indication that the update is to be deployed to the second environment;
accessing the table to identify the update;
displaying to a user information associated with the update, based on the identification of the update;
receiving from the user a selection instructing a deployment of the package; and
deploying the package including the update to the second environment of the multi-tenant on-demand database system, in response to the selection.

21. A method for transmitting code, comprising:
transmitting code to change a portion of an application implemented at a first environment of a multi-tenant on-demand database system to include an update, where the first environment includes a first organization implemented by the multi-tenant on-demand database system;
transmitting code to test the portion of the application that includes the update to verify a functionality of the update within the first environment, utilizing a hardware processor;
transmitting code to receive an indication of a second environment of the multi-tenant on-demand database system to which the update is to be deployed, where the second environment includes a second organization implemented by the multi-tenant on-demand database system;
transmitting code to create a package that includes the update after verifying the functionality of the update within the first environment;
transmitting code to insert a row in a table of the second environment in response to receipt of the update, for indicating the receipt of the update and the receipt of the indication that the update is to be deployed to the second environment;
transmitting code to access the table to identify the update;
transmitting code to display to a user information associated with the update, based on the identification of the update;
transmitting code to receive from the user a selection instructing a deployment of the package; and
transmitting code to deploy the package including the update to the second environment of the multi-tenant on-demand database system, in response to the selection.

* * * * *